US012681449B2

(12) United States Patent
Klein

(10) Patent No.: US 12,681,449 B2
(45) Date of Patent: Jul. 14, 2026

(54) PROXIMITY BASED CONTROLLER ACCESS

(71) Applicant: RACHIO, INC., Denver, CO (US)

(72) Inventor: Christopher M. Klein, Denver, CO (US)

(73) Assignee: RACHIO, INC., Denver, CO (US)

( * ) Notice: Subject to any disclaimer, the term of this patent is extended or adjusted under 35 U.S.C. 154(b) by 473 days.

(21) Appl. No.: 18/208,725

(22) Filed: Jun. 12, 2023

(65) Prior Publication Data

US 2023/0408995 A1 Dec. 21, 2023

Related U.S. Application Data

(60) Provisional application No. 63/353,967, filed on Jun. 21, 2022.

(51) Int. Cl.
G05B 19/042 (2006.01)
(52) U.S. Cl.
CPC .... G05B 19/042 (2013.01); *G05B 2219/2625* (2013.01)
(58) Field of Classification Search
CPC ..................... G05B 19/042; G05B 2219/2625
See application file for complete search history.

(56) References Cited

U.S. PATENT DOCUMENTS

| | | | |
|---|---|---|---|
| 2012/0094638 A1* | 4/2012 | Shamoon | G08C 17/02 |
| | | | 455/414.1 |
| 2015/0358332 A1* | 12/2015 | Glickfield | H04L 63/062 |
| | | | 726/4 |
| 2018/0159854 A1* | 6/2018 | Schlegel | H04L 63/0876 |
| 2021/0285668 A1* | 9/2021 | Uerkvitz | G05B 19/0426 |

* cited by examiner

*Primary Examiner* — Chad G Erdman
(74) *Attorney, Agent, or Firm* — Dorsey & Whitney LLP

(57) ABSTRACT

In one aspect, a method of providing electronic access to a controller (e.g., sprinkler or lighting controller) associated with a first user is disclosed. The method includes determining, via a processing element, a proximity of an access device to the controller, wherein the access device is associated with a second user different than the first user; automatically providing, via the processing element, a grant of access for electronic communications between the controller and the access device based, at least in part, on the proximity of the access device to the controller; displaying, on a user interface rendered by a user device associated with the first user, a message indicating the grant of access.

20 Claims, 9 Drawing Sheets

PROXIMITY BASED CONTROLLER ACCESS

CROSS REFERENCE TO RELATED APPLICATION

This application claims priority to U.S. Application No. 63/353,967 filed on Jun. 21, 2022 titled "Proximity Based Controller Access," which is incorporated by reference herein for all purposes.

FIELD

This disclosure relates generally to systems and methods for providing automatic electronic access to controllers for various peripheral devices, e.g., sprinkler systems, light bulbs, security systems, etc.

BACKGROUND

Irrigation controllers and related home systems are becoming increasingly automated. Such automation often involves the use of one or more controllers that control different aspects of a particular system, such as, for example, an irrigation system that controls sprinklers, valves, sensors, etc. As a specific example, a building may have an irrigated area associated therewith, such as a lawn, garden, or greenhouse whose irrigation is controlled by an irrigation controller via control of fluid flow to watering devices such as sprinklers, drip irrigation emitters, or the like.

Such automation is reaching other portions of buildings as well. For instance, a home may have a sprinkler controller, smart lighting, or appliance controller that operates lights, appliances, doors, etc. at various times of the day and/or in response to one or more sensed inputs (e.g., motion, daylight, etc.). Similarly, buildings may have security controllers that control aspects of entry to, or security of a building, such as controlling credential-based access, door locks, security cameras, alarms, window breakage sensors, etc. In another example, a building may have a fire controller that controls various fire-related devices to detect the presence of fire and/or smoke and activates an alarm, notifies the fire department, and/or closes fire doors.

To adjust an aspect of the operation of these and other automation systems using traditional controllers, the controller typically needs to be accessed manually by a person such as an owner or a service technician. Due to this configuration, and the fact that many of these types of controllers are in a residential or other private property area, in instances of maintenance or malfunction, these systems often require scheduling coordination between the owner of the sprinkler system or property and maintenance personnel to allow the maintenance personnel physical access to the control system and deactivate, modify, or otherwise control or repair the sprinkler system.

Some controllers are capable of connecting to a network and enabling remote access to the controller. However, these controllers are typically connected to the network using the private network credentials of the building's network, e.g., input by the building owner or an installer. Many building users may not be comfortable providing their private network credentials to a service technician or providing the technician with a personal device in order to access the controller. Furthermore, such systems still require complex and time-consuming manual interaction by the homeowner to allow an installer or service technician to access the controller. Improved systems and methods that enable easy and secure access to controllers are desired.

BRIEF SUMMARY

A method of providing electronic access to a controller is disclosed. In one embodiment, the controller is associated with a first user. The method includes determining, via a processing element, a proximity of an access device to the controller. The access device is associated with a second user different than the first user. The method includes automatically providing, via the processing element, a grant of access for electronic communications between the controller and the access device based, at least in part, on the proximity of the access device to the controller; displaying, on a user interface rendered by a user device associated with the first user, a message indicating the grant of access.

Optionally, in some embodiments, the method further includes generating, with the processing element, a virtual boundary, wherein the grant of access is based, at least in part, on a proximity of the access device to the virtual boundary.

Optionally, in some embodiments, the controller is within an area defined by the virtual boundary.

Optionally, in some embodiments, the virtual boundary is based on a distance from a geographic point.

Optionally, in some embodiments, the proximity of the access device is determined based on receipt of a wireless signal from the access device.

Optionally, in some embodiments, the wireless signal comprises at least one of a Bluetooth signal, a Wi-Fi signal, or a near field communication signal.

Optionally, in some embodiments, a location of the access device is determined based on a communication between the access device and a global navigation satellite system.

Optionally, in some embodiments, the method further includes receiving authentication data related to an access privilege of a user associated with the access device.

Optionally, in some embodiments, the method includes providing the grant of access is based, at least in part, on the authentication data.

Optionally, in some embodiments, the method includes generating a notification based on the grant of access.

Optionally, in some embodiments, the method includes receiving, from the user device, a user input revoking or confirming the grant of access.

Optionally, in some embodiments, the user input to revoke or confirm the grant of access is generated by the user device responsive to the user device receiving the notification.

Optionally, in some embodiments, the grant of access includes access to an access level of a plurality of access levels.

Optionally, in some embodiments, the user interface is based on the access level.

Optionally, in some embodiments, the proximity of the access device to the controller is based, at least in part, on a lookup table.

Optionally, in some embodiments, the method includes modifying a setting of the controller via the user interface.

Optionally, in some embodiments, the grant of access is for a period of time.

Optionally, in some embodiments, the method includes automatically revoking the grant of access after the expiration of the period of time.

A system for providing electronic access to a controller associated with a first user is disclosed. In one embodiment the system includes a processing element; a user device associated with the first user; an access device associated with a second user different than the first user. The processing element is configured to: determine a proximity of the access device to the controller; automatically provide a grant of access for electronic communications between the controller and the access device based, at least in part, on the proximity of the access device to the controller; and display, on a user interface rendered by the access device, a message indicating the grant of access.

Optionally, in some embodiments, the processing element is further configured to: generate a virtual boundary; and automatically provide the grant of access based, at least in part, on a proximity of the access device to the virtual boundary.

Optionally, in some embodiments, the controller is within an area defined by the virtual boundary.

Optionally, in some embodiments, the proximity of the access device to the controller is based, at least in part, on a lookup table.

Optionally, in some embodiments, the processing element is further configured to modify a setting of the system via the use interface.

Optionally, in some embodiments, the grant of access is for a period of time.

Optionally, in some embodiments, the system further includes automatically revoking the grant of access after the expiration of the period of time.

DETAILED DESCRIPTION

Figure 1:
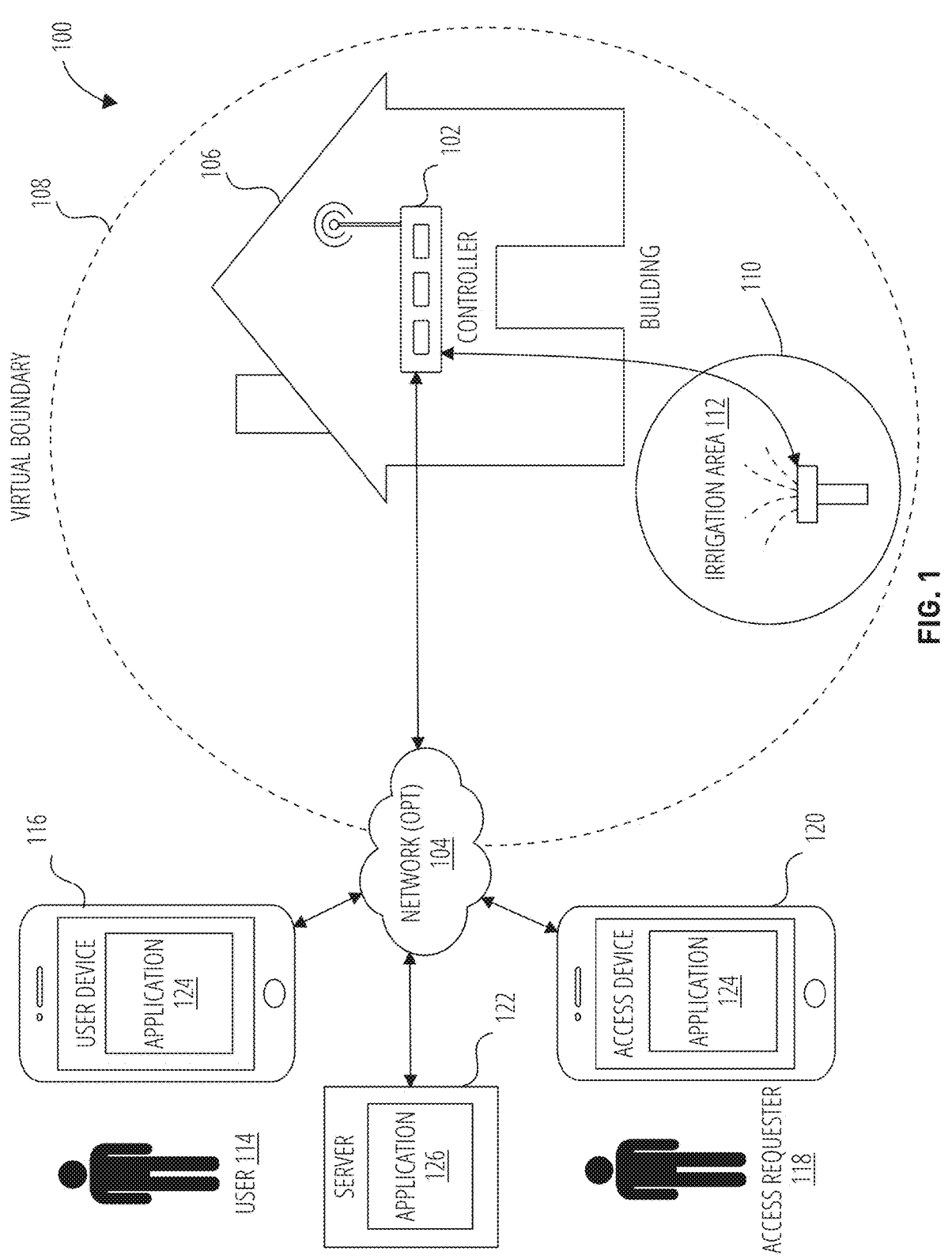
FIG. 1 is a simplified schematic of an embodiment of a system to provide access to a controller.

The present disclosure is directed to systems and methods of providing access to a controller such as a security controller, lighting controller, fire controller, irrigation controller, smart appliance controller or the like (or simply "controller") from a user device, based at least in part on the physical proximity of a user device to the controller. For example, a virtual boundary such as a geofence may be established near the controller such that a user device is automatically granted electronic access to the controller based at least in part on the proximity of the access device to the virtual boundary. The access device can be a typical user device such as a smart phone or a specialty coupling device, such as a remote controller, that can be used to authorize access to the controller and display information on the smart phone or may be used instead of a smart phone. In some embodiments, two or more access devices may be in communication with one another in a daisy-chain fashion to request electronic access to the controller based on the proximity of one or more of the access devices to the controller. In another example, a device may be automatically granted access to the controller based on the device being within a distance threshold of the controller. In another example, a device may be automatically granted access to the controller based on permissions set for the device or type of device.

In one example, a sprinkler controller may be located physically on a property that can include an irrigation area such as a yard or garden, one or more non-irrigated land areas, and/or one or more building such as a home, garage, shed or other area where physical access is limited to those with access privileges. In some embodiments, a controller such as an irrigation controller is associated with a target area to be irrigated such as a yard, garden, farm, park, golf course, or the like. In the example of an irrigation controller, the controller may provide or control electrical power flow to a fluid valve that causes the valve to open or close, thereby controlling the flow of a fluid (e.g., water) therethrough to a watering device such as a sprinkler. The controller may control more than one valve and/or watering device that are organized into one or more zones. Watering zones may cover different portions of the irrigation area. The zones may be separate from one another or may at least partially overlap. Similarly, a security or lighting controller may be associated with a building and/or area associated with the building (e.g., yard, parking lot, etc.) including one or more sensors and/or one or more actuators. Lighting, fire, and/or security controllers may similarly organize sensors and actuators into one or more zones such as lighting or security zones. For example, a lighting controller may provide illumination (e.g., activation) schedules to one or more lighting elements, such as outdoor lighting, and the lighting controller may be accessed in a similar manner as described herein.

Advantages of locating the controller in an area with physical access limitations may be the ability to prevent unwanted tampering with, or vandalism to, the controller. However, limiting physical access to the controller has the disadvantage of depriving service personnel from accessing the controller for legitimate reasons (e.g., to perform maintenance, configuration, winterization, or the like). The systems and methods of the present disclosure improve over existing devices and methods in that the disclosed systems and methods provide for the physical security of the controller, while also providing for simple, automatic, secure remote access to the controller by persons with legitimate access needs based on the proximity of an access device to the controller, and without the need for cumbersome interaction or coordination between a system owner and service personnel.

In some examples, the systems and methods disclosed herein may allow a contractor or service professional (or other third party) to have temporary access to a controller or associated device for a period of time (e.g., a set period of time and/or for as long as the professional is near the controller), such as to repair or modify the system and/or the device based on a determination that the professional is within a threshold distance of the device and has permission to access the controller or device from the owner. The permission may be given in real time, e.g., as the professional is walking or driving proximate to the device, or may be given ahead of time such as authorization for any time period or for a short period such as an hour, a day, a week, a specific day (e.g., any time during Thursday the 12$^{th}$ of June), the week of a specific day (e.g., the week in which Thursday the 12th falls), the same day every week (e.g., every Thursday), the same day or days every month (e.g., the 1st and 14th of every month), one or more seasons, (e.g., spring, summer, and fall), a date range (e.g., from Memorial Day to Labor Day), combinations of any of these, and/or full time until revoked (e.g., a regular lawn care technician). The grant of access may be automatically revoked after the expiration of the period of time and/or after the access device has left the threshold distance or exited the geofence (e.g., moved away from the controller location).

As compared to some IoT systems that enable remote access, the present disclosure allows authorization of the access but only permits actual access once the access device (e.g., professional or third party) is near the controller. This helps to prevent inadvertent security risks since while a third party is authorized to access a particular device, the access requires the secondary requirement of physical proximity in addition to the permissions already granted by the owner device. This helps to ensure that remote access is still enabled, while reducing the window or other opportunities for breach of the controller. In other words, the present system can function as a dual-authentication, requiring both electronic access (e.g., permission within the database for access) and physical proximity to enable full access of the controller.

With reference to FIG. 1, a schematic representation of an access system 100 is shown. While FIG. 1 is directed to an example access system 100 using an irrigation controller, the disclosed methods and systems are equally applicable to access systems 100 with other types of controllers 102 such as security controllers, lighting controllers, smart home controllers, etc. For example, many implementations may be used with other Internet of Things (IoT) devices, that may need to provide electronic access to a service professional or the like, as such the discussion any particular implementation is meant as illustrative only.

With reference to FIG. 1, the access system 100 includes a controller 102. The controller 102 may be associated with a building 106. The controller 102 may be inside the building 106, attached to the exterior of the building 106, located proximate to the building 106 but not physically in contact with the building 106, or located distant from the building 106. In short, the controller 102 may be positioned to be associated with a particular location, e.g., a residential home, and configured to be electrically coupled to one or more devices (e.g., lights, valves, etc.) that it controls based on a schedule, user commands, or the like.

The controller 102 is in electronic communication with one or more components of the system and may be used to control different devices (e.g., peripheral or automation devices) and may be in electrical communication with one or more sensors and/or one or more actuators for the devices. As used herein, a sensor is any device that detects a physical parameter and generates a controller-readable signal in response to the detected physical parameter. Some examples include, but are not limited to: rain sensors, thermometers, insolation sensors, motion sensors, lighting sensors, break-in sensors, cameras, switches, smoke detectors, etc. As used herein, an actuator is any device that receives a signal from the controller and generates a physical response based on the signal. Some examples include, but are not limited to: valves, solenoids, door locks, alarms, messaging devices (e.g., email, phone dialers, and text messengers), lights, etc. Signals may be sent/received to/from sensors and/or actuators directly from the controller and/or via a network 104. Signals may be sent via wired and/or wireless communication. Any of the electrical communication in the system may be encrypted or otherwise secured from tampering or outside interference.

As shown in FIG. 1, the controller 102 may be in electrical communication with one or more peripheral devices, e.g., actuators such as a watering device 134. The watering device 134 may be disposed to irrigate an irrigation area 112 associated with the building 106. While, in many examples, the irrigation area 112 may be proximate to the building 106 (e.g., a yard or garden) in some examples, the irrigation area 112 may be located away from the building 106 (e.g., a centralized controller at a golf course). The controller 102 may also be in electrical communication with one or more sensors (not shown) such as an insolation sensor, rain sensor, thermometer, and/or camera.

The access system 100 may optionally include, or be in communication with, a network 104. The network 104 may optionally be associated with the building 106 and/or the controller 102. The network 104 may be a wired or wireless network 104. The controller 102 may be in electrical communication with the sensors and/or actuators 110 either directly or via the network 104. The network 104 may be a local network 104 such as a Bluetooth or Wi-Fi network, a cellular telephone network, or may be the internet, a private network, a local area network, or a combination thereof.

The access system 100 may optionally include, or be in communication with, a server 122. A server 122 may be a remote server, such as a cloud computing resource, and may be in electrical communication with the controller 102 directly or via the network 104.

The controller 102 may be electronically accessible by one or more persons, such as a user 114 and/or an access requester 118. Electronically accessing a device may include communicating with a device via any wired, wireless, visual, or auditory method for example to view or change settings, parameters, configurations, sensor readings, or to manually actuate a device, download data, upload executable code, send or receive messages, etc. Typically, a user 114 is a person or organization that owns, leases, or otherwise uses the building 106 and the controller 102 on a regular basis or is otherwise the main account holder for the controller. For example, the user 114 may be a homeowner, business owner, or the like. The access requester 118 may be a person or organization who does not typically use the building 106 or the controller 102 on a regular basis, but needs periodic or intermittent access to the controller 102 such as for maintenance, commissioning, upgrade, or the like, e.g., a third party such as a maintenance professional. An access requester 118 may typically be an installer or service technician.

The controller 102 may be in electrical communication with one or more external devices such as a user device 116 and/or an access device 120. The user device 116 may be associated with the user 114 and have regular electronic access to the controller 102. An access device 120 may be associated with the access requester 118 and have periodic or intermittent electronic access to the controller 102. The user device 116 and the access device 120 may be any type of computing device but are typically a smart phone, tablet, laptop, desktop computer, or remote control, etc. An access device 120 can communicate with a controller 102 based on the proximity of the access device 120 to the controller 102. In some embodiments, two or more access devices may communicate with one another in a daisy-chain fashion to a controller 102. For example, a first access device 120 may communicate with a second access device, that communicates with the controller 102.

In one specific example of daisy-chain communication, a first access device 120, such as a remote control, may communicate to a second access device 120, such as a smart phone, via a wireless signal such as Bluetooth. The smart phone 120 may communicate with the controller 102 via the network 104. The controller 102 may then grant electronic access to the remote control 120 and/or the smart phone 102 based on the proximity of either, or both, devices to the controller 102. For example, the first access device 102 in the chain may be proximate to the controller 102 and the second access device 102 may be in communication with the first access device 120 and may be in within a distance threshold of the first access device 120. The second access device 120 may or may not be proximate to the controller 102. In some embodiments, both access devices 120 may be proximate to the controller 102 for access to be granted. In some embodiments, only one access device 120 may be proximate to the controller 102 for access to be granted. The granted electronic access between the controller 102 and the remote control 120 may be directly from the controller 102 to the remote control 120, or indirectly via the smart phone 120 and/or one or more networks such as the network 104.

A virtual boundary 108 may be established in relation to the controller 102 and/or the building 106. In many examples, the controller 102 and/or building 106 may be located within the virtual boundary 108. In some embodiments, the controller 102 may be located within the virtual boundary 108 and the building 106 may be located partly within the virtual boundary 108 or may be located outside the virtual boundary 108. In some embodiments, the controller 102 may be located outside the virtual boundary 108 or partly inside the virtual boundary 108.

The virtual boundary 108 may be established by the controller 102, by the network 104, or some other device. For example, the virtual boundary 108 may be defined by a wireless communication range of the network 104 and/or the controller 102. In some examples, the virtual boundary 108 is based on one or more physical coordinates or locations. For example, the virtual boundary 108 may be one or more geolocation coordinates such as latitude, longitude, and/or elevation. In some embodiments, the virtual boundary 108 may be a closed boundary such as a polygon or irregular shape. In some embodiments, the virtual boundary 108 may be based on a single geographic point. For example, the virtual boundary 108 may be based on a distance (e.g., radius) from the single geographic point, e.g., a location of the controller. In many embodiments, the geolocation data may include latitude and longitude data. In some embodiments, elevation data may be included in the geolocation data. Elevation may be included for example, where a controller 102 is located in an apartment or condominium in a high-rise building. Elevation data may be used to differentiate one controller 102 on one floor from a controller 102 on a different floor, even though the two controllers 102 have similar latitude and longitude data.

The access device 120 and/or the user device 116 may determine the location of the respective device based on a Global Navigation Satellite System ("GNSS"), such as— The United States' Global Positioning System ("GPS"), Russia's GLONASS, Europe's Galileo System, China's BeiDou, and/or one or more regional navigation systems such as Japan's QZSS or India's IRNSS or NavIC systems. For simplicity, these systems are referred to herein collectively, individually, and in combination as GNSS. Alternately, or additionally, the access device 120 and/or user device 116 may determine the location of the respective device based on cell phone network tower radio triangulation, Wi-Fi location, or the like. In still other examples, the geolocation data may be based on an address, telephone number, or the like. For example, the access system 100 may include a lookup table containing addresses or locations of controllers 102 associated with the system 100. The access system may use a location of the access device 120 to look up the locations of nearby controllers in the lookup table and may automatically provide access to the nearby controllers retuned from the lookup action.

The server 122 may include and be adapted to execute a server application 126. For example, the server 122 may have location or other data (e.g., latitude data, longitude data, elevation data, etc.) associated with the virtual boundary 108 stored in a memory component thereof and accessible via the server application 126. The user device 116 and/or the access device 120 may execute the device application 124. The device application 124 may display, via the respective device, a user interface 130 including user inputs and/or user outputs. See, e.g., FIG. 3-FIG. 8. The device application 124 may electronically communicate with the server 122 to retrieve the location data related to the virtual boundary 108. The server application 126 can be a computer program executed by one or more processors in the server 122. The server application 126 may, for example, provide an interface for receiving instructions from one or more devices (e.g., the user device 116 and/or the access device 120) either via the network 104 or directly. In some embodiments, the server application 126 can be a portion of a larger controller application. In other embodiments, the server application 126 can be a stand-alone computer application. In some embodiments, the server application 126 can be a web application ("web app") accessible via the network 104 through a web browser or through the device application 124 stored on a device connected to the network 104. In various embodiments, the server application 126 can provide one or more devices connected to the network 104 with the ability to adjust, change, control, or otherwise modify an aspect of the controller 102 or any device settings thereof. Device access for the access device 120 can be temporary, permanent, or at the discretion of a user 114.

Figure 2:
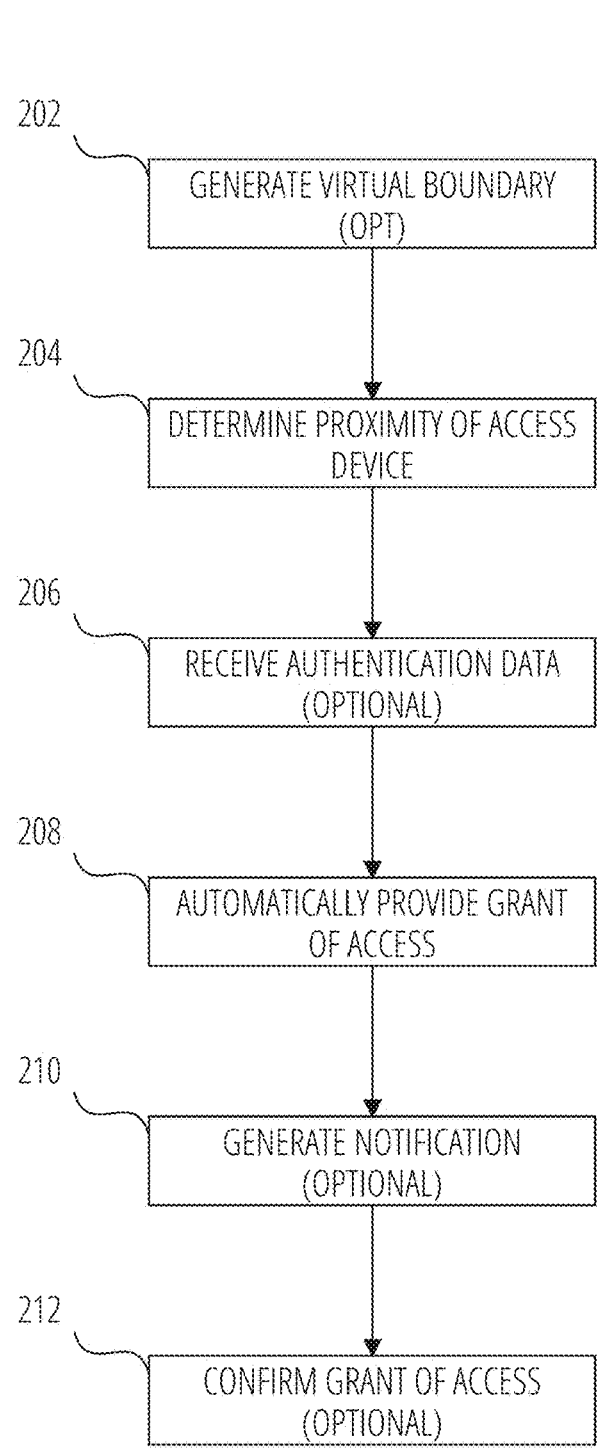
FIG. 2 is a flow chart of a method for providing access to a controller with the system of FIG. 1.
Figure 3:
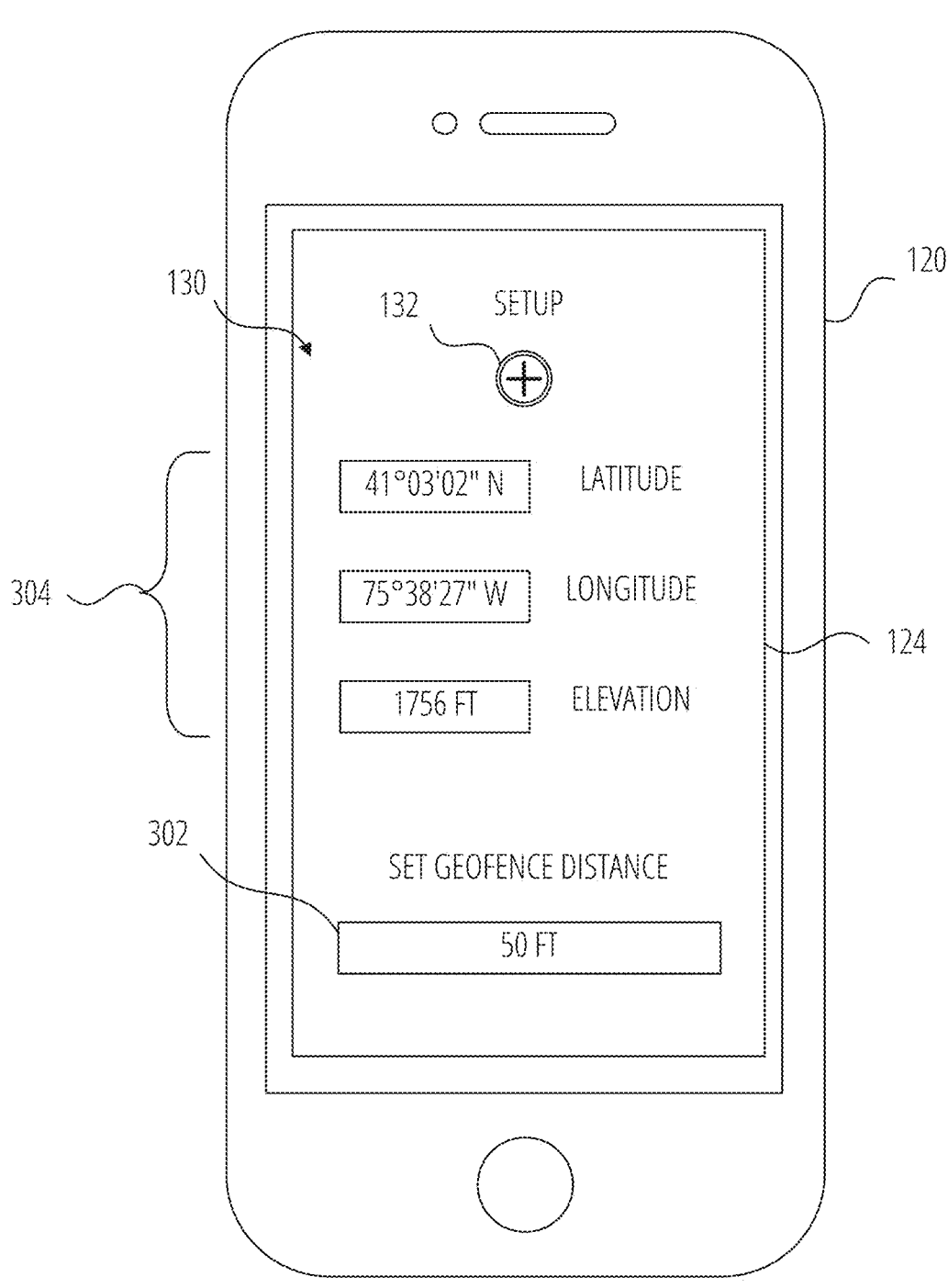
FIG. 3 illustrates an example of a user interface of a device of the system of FIG. 1 in a first configuration.
Figure 4:
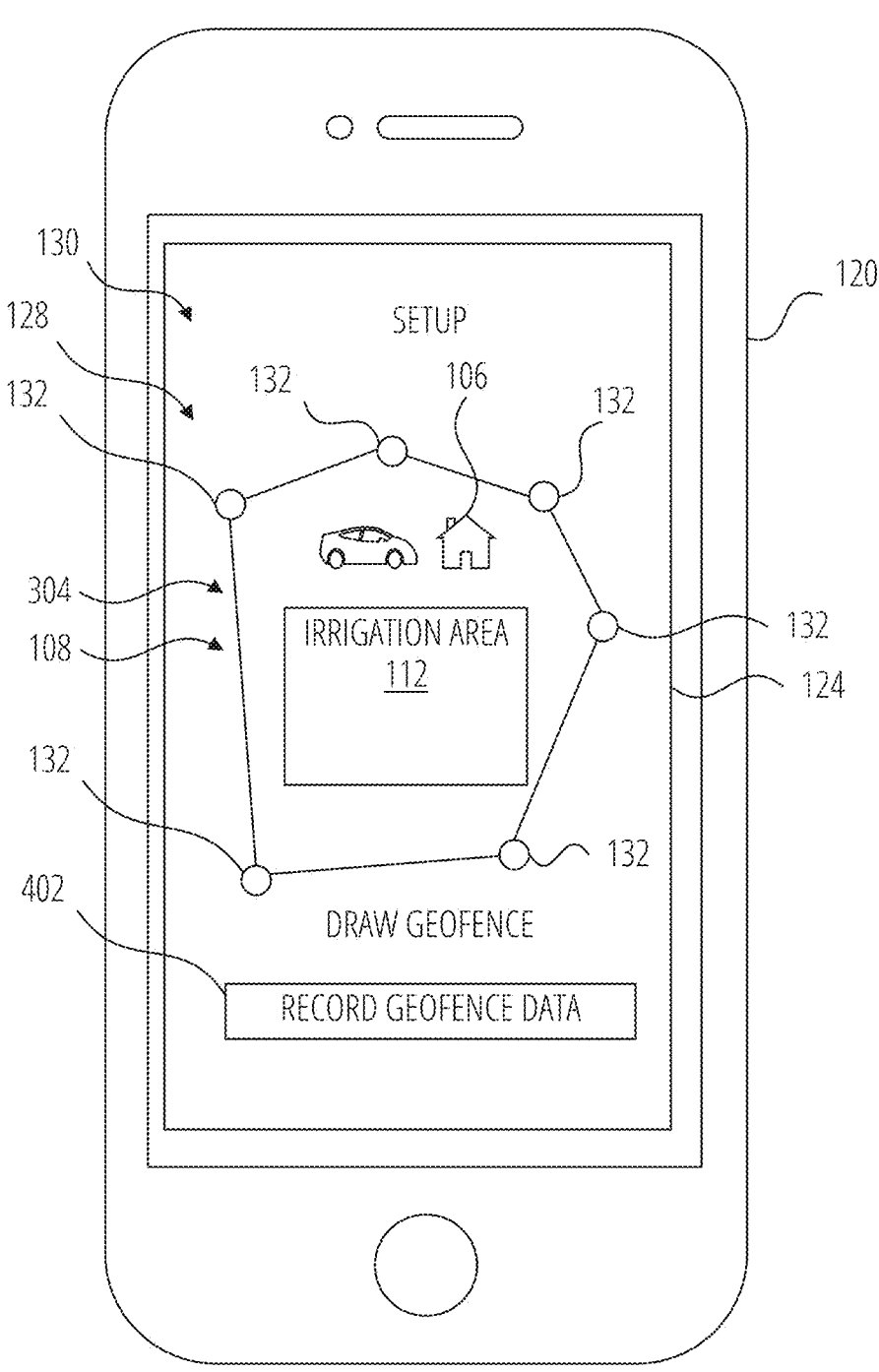
FIG. 4 illustrates an example of a user interface of a device of the system of FIG. 1 in a second configuration.

With reference to FIG. 2, a method of providing electronic access to a controller 102 via an access system 100 is disclosed. The method 200 may be executed in an order other than as shown, and one or more steps may be omitted. Additionally or alternatively, two or more operations may be executed in parallel. Furthermore, one or more operations may be executed by one device of the access system 100 (e.g., a user device 116, access device 120, controller 102, or server 122) and one or more other operations executed by another device of the access system 100 (e.g., a user device 116, access device 120, controller 102, or server 122). Additionally, parts of a single operation may be executed on multiple devices.

The method 200 may begin in operation 202 when the access system 100 generates the virtual boundary 108. In some examples, the operation 202 may be optional. In examples where the geolocation data includes a single geographic point 132 (e.g., latitude, longitude, and optionally elevation), the virtual boundary 108 may be defined as a distance (e.g., radius) from the geographic point 132. In examples where the geolocation data includes multiple geographic points 132, the virtual boundary 108 may be based on a polygon or other shape formed by the geographic points 132. Where elevation is included, the virtual boundary 108 can be three dimensional (e.g., a sphere, cube, or other volumetric shape). In some examples, a user 114 or service technician may define the virtual boundary 108 when setting up the controller 102. For example, the user 114 may position the user device 116 close to the controller 102, such that, at least temporarily, the location of the user device 116 and the controller 102 are substantially the same. The device application 124 may communicate with a GNSS satellite and determine a location of the user device 116, and thus the controller 102. The device application 124 may display a geolocation data display 304 indicating the location of the user device 116, access device 120, controller 102, or one or more geographic points 132. The device application 124 may display a user input 302 prompting the user 114 to specify a distance from the location of the user device 116, access device 120, and/or controller 102 at which to place the virtual boundary 108. See, e.g., the example of a user interface 130 shown in FIG. 3.

In another example, the device application 124 may display a map view, satellite view, street view, schematic view, or other representation 128 of the location of the user device 116, building 106, irrigation area 112, and/or controller 102 and prompt a user 114 to draw the virtual boundary 108 on the representation 128 using an I/O interface 906 of the user device 116. The user interface 130 may allow a user 114 or access requester 118 to select a plurality of geographic points 132 defining the virtual boundary 108. The geographic points 132 may form a closed virtual boundary 108. The device application 124 may display a user input 402 prompting the user to record the geolocation data of the virtual boundary 108. See, e.g., FIG. 4.

Figure 5:
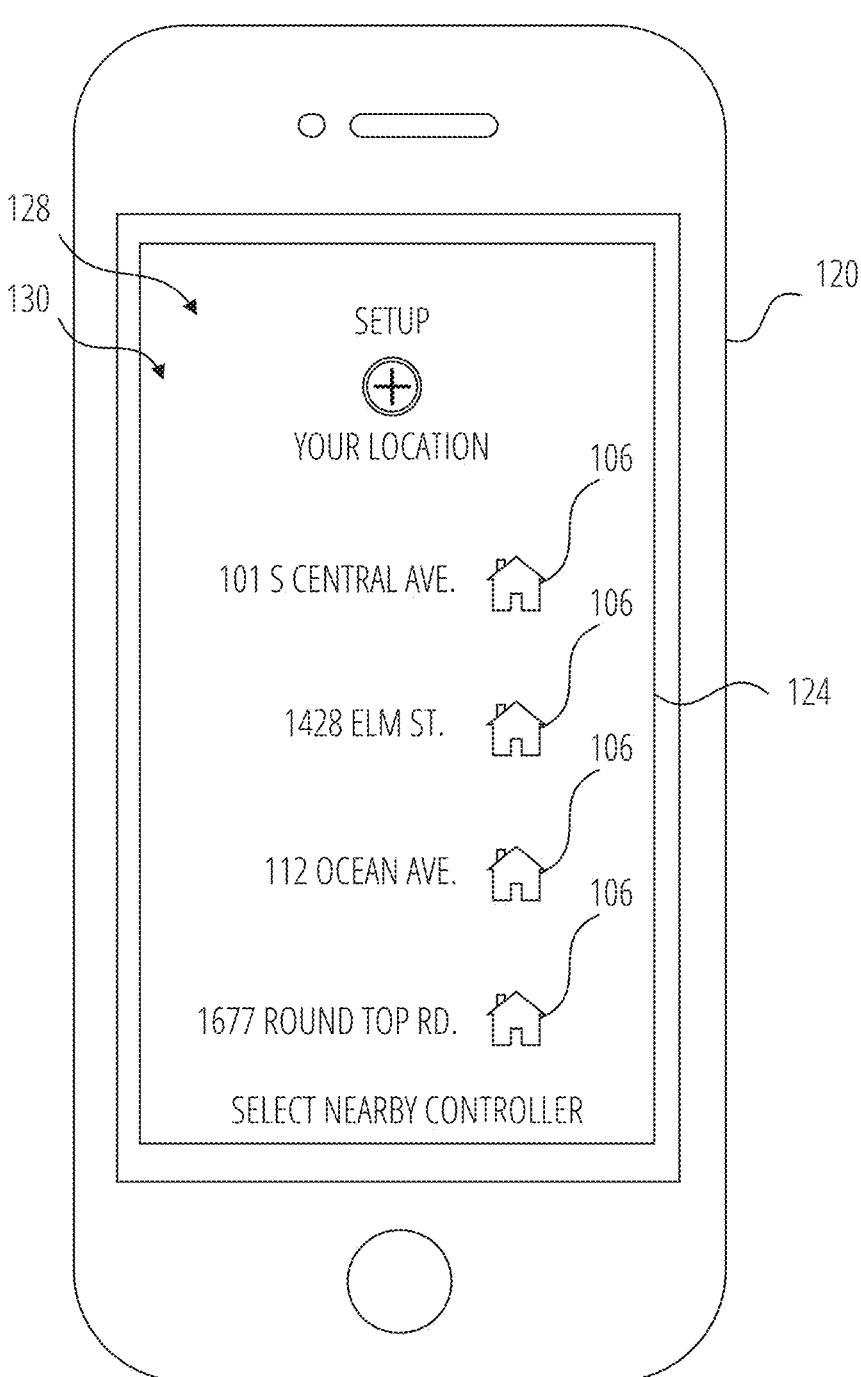
FIG. 5 illustrates an example of a user interface of a device of the system of FIG. 1 in a third configuration.
Figure 6:
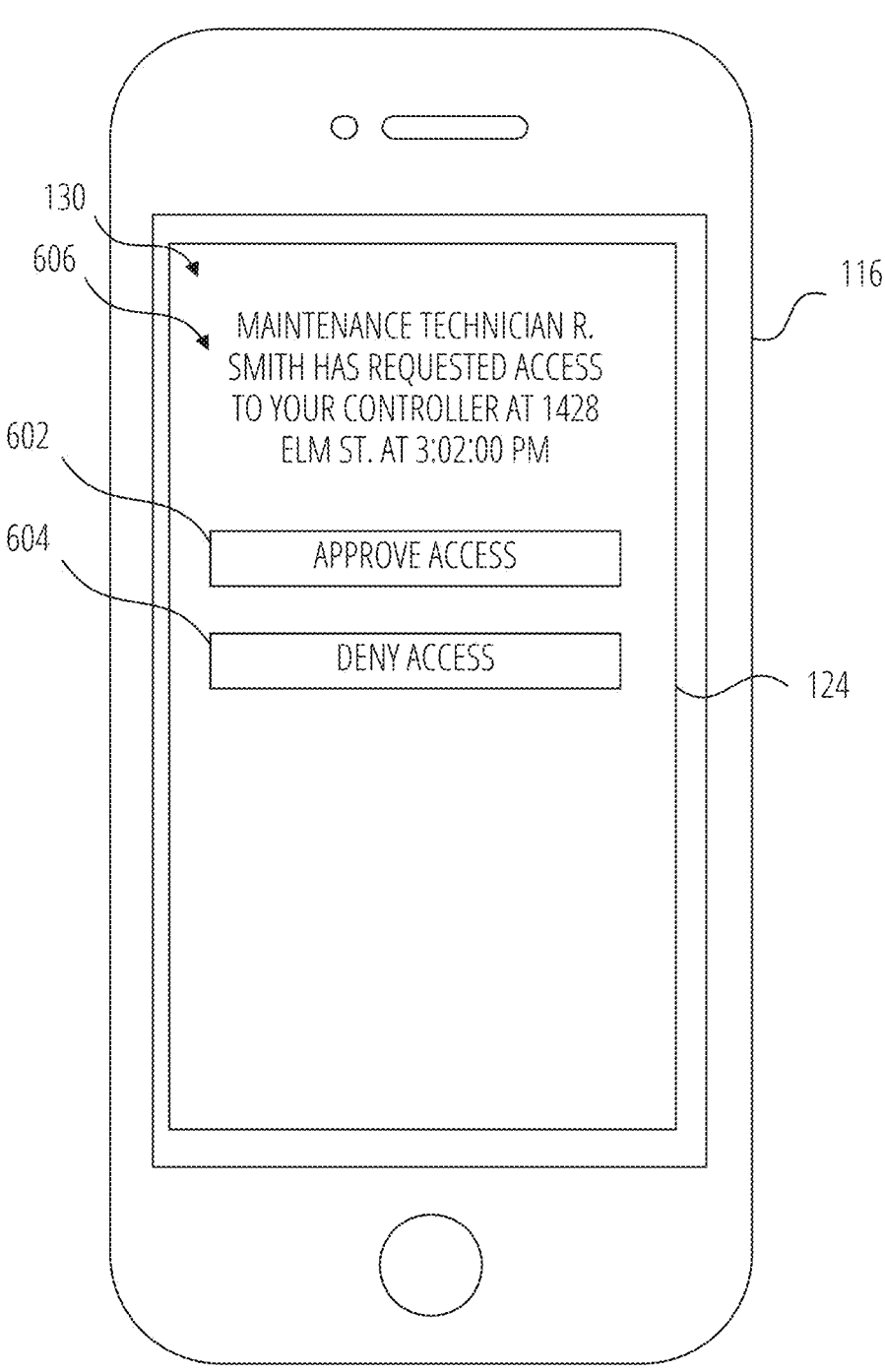
FIG. 6 illustrates an example of a user interface of a device of the system of FIG. 1 in a fourth configuration.

In another example, as shown in FIG. 5, the device application 124 may determine the location of the user device 116 or access device 120 as described herein and display a representation 128 that shows nearby controllers 102 associated with one or more buildings 106. The device application 124 may prompt the user 114, access requester 118 such as a technician to select a nearby controller 102 or building 106. In some examples, a nearby controller may be within several feet, fifty feet, 90 feet, 500 feet, 1000 feet, a mile, or several miles of the user device 116 or access device 120. The device application 124 may display an address associated with the building 106 and/or controller 102 being set up. The device application 124 may prompt the user 114 or access requester 118 to select the appropriate nearby controller for which to record geolocation data.

The geolocation data of the virtual boundary 108 may be stored in a memory component 912 of the server 122, the controller 102, the access device 120, and/or the user device 116 and/or transmitted between two or more of these devices either directly or via the network 104. The operation 202 may be executed by the access device 120 by a user 114 or by a service technician or other access requester 118.

The method 200 may continue to operation 204 and the access system 100 determines a proximity of the access device 120 to the virtual boundary 108. For example, as described herein, the access device 120 may execute a device application 124 that determines the location of the access device 120 such as via GNSS, radio triangulation, Wi-Fi, etc. The device application 124 may send the access device 120 location data to another portion of the access system 100 such as the server 122, the controller 102, a user device 116, etc., either directly or via the network 104. The access system 100 may compare the access device 120 location with the geolocation data of the virtual boundary 108 to determine whether the access device 120 is proximate to, or within, the virtual boundary 108.

The method 200 may continue to operation 206 and the access system 100 optionally receives authentication data. The authentication data may be used as a security check against unauthorized access to the controller 102. For example, the device application 124 may request that the access requester 118 enter or select an address associated with the controller 102 for which access is being requested. In another example, the access requester 118 may be prompted by the device application 124 to enter a password, keyword, passphrase, employee number or other identifying information. The device application 124 may communicate the authentication data to another device of the access system 100 such as the server 122, the controller 102, and/or a user device 116, for comparison against stored information used to verify the authenticity of the authentication data. For example, the server application 126 may compare received authentication data against authentication data stored in memory to determine whether the authentication data is legitimate. In this operation, the system may complete an electronic authentication, which may be prompted by the physical proximity or other trigger, helping to increase secure access to the controller.

The method 200 may continue to operation 208 and the access system 100 automatically grants electronic access to the controller 102. For example, the server application 126 may send a message or command to the access device 120 and/or controller 102 enabling electronic communication therebetween. When access is granted, the device application 124 may configure, enable, disable, or otherwise control aspects of the controller 102. The device application 124 may read the output of a sensor and/or activate an actuator 110. In the example of an irrigation controller, the device application 124 may turn on a valve such that the access requester 118 can evaluate the functioning of one or more watering devices. In another example, the device application 124 may read a value of a sensor such as a rainfall sensor in electronic communication with the controller 102.

The electronic access granted to the access device 120 may have a plurality of different levels of access or permissions to interact with the controller 102. For example access may be granted for read-only access such that the access device 120 may receive outputs from the controller 102 but not make any changes to the controller 102. In other examples, read/write access may be granted to the access device 120, such that the access device 120 can write data (e.g., configurations, parameters, settings, executable code, etc.) to the controller 102. In some examples, an access level is determined by the access system 100 based on the authentication data.

Figure 7:
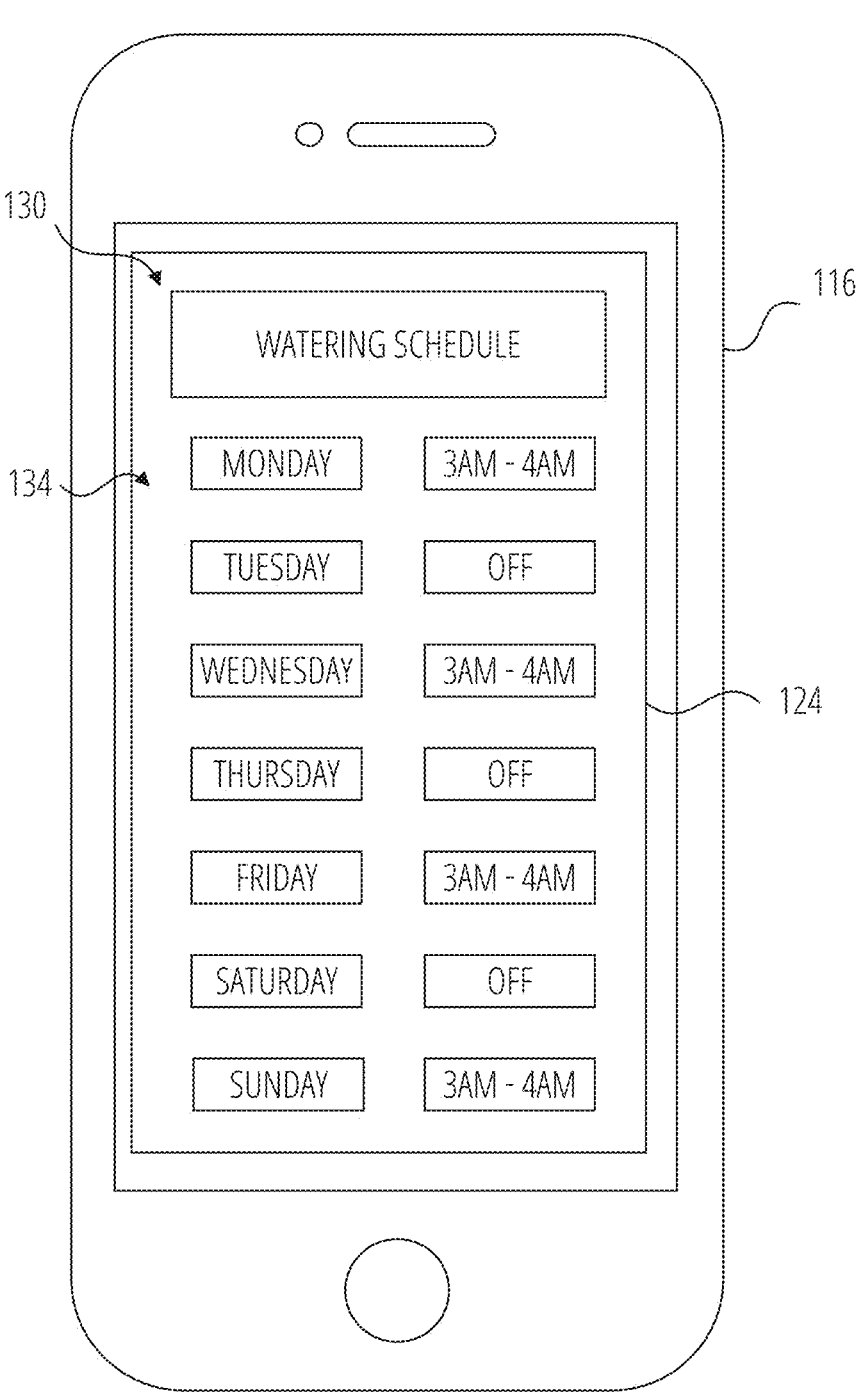
FIG. 7 illustrates an example of a user interface of a device of the system of FIG. 1 in a fifth configuration
Figure 8:
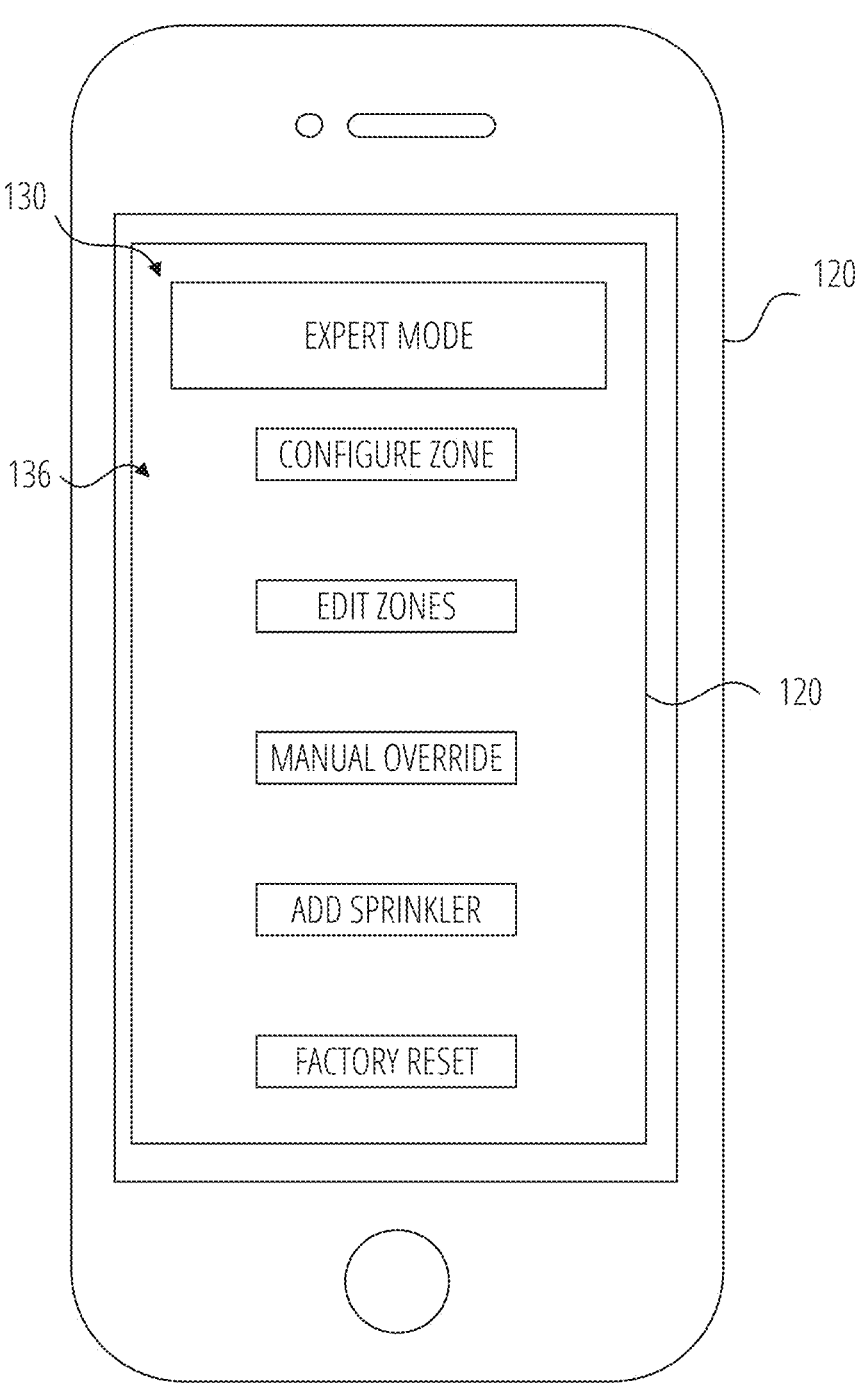
FIG. 8 illustrates an example of a user interface of a device of the system of FIG. 1 in a sixth configuration

As shown for example in FIGS. 7 and 8, the user interface 130 may adapt based on the level of permission granted. For example, when a user device 116 displays a graphical interface 130, it may display a user configuration 134 that shows status or overview information about the devices controlled by the controller. In some examples, the user 114 version of the graphical interface 130 may display simple setting such as watering times and/or days. As shown in another example in FIG. 8, such as when an access device 120 displays a graphical interface 130 in an "expert" configuration 136 may include detailed or low level "expert" settings not meant to be accessed by an end user 114. In some examples, the permissions may include the ability of a professional 118 to access the user's 114 account on an access device 120. In some examples, a user 114 and/or an access requester 118 may be able to see, use, and/or control various settings, features, or status of the devices of the access system 100, a controller 102, or the associated devices associated with a user account for one or more access systems 100. For example, an access requester 118 may be able to modify a setting of the controller 102 via a graphical interface 130 displayed on the access device 120.

The method 200 may continue to operation 210 and the access system 100 may optionally generate a notification. A device of the access system 100 such as the access device 120, the controller 102, and/or the server 122 may generate a message 606 such as an email, text message, phone call, or the like to notify the user 114 that access has been requested and/or granted to the controller 102. As shown for example in FIG. 6, the message 606 may be sent to and displayed via the device application 124 on the user device 116, such as through a badge or push notification. The message 606 may include visual information such as text, video, pictures, and/or audio information such as a chime or alarm. In some examples, the access system 100 may generate a message 606 responsive to operation 204 indicating that an access device 120 is within or near to the virtual boundary 108. In some examples, the access system 100 may generate a message 606 responsive to operation 206 when an access requester 118 enters authentication data. In some examples, the access system 100 may generate a message 606 responsive to operation 208 and the automatic grant of access to the controller 102.

The method 200 may continue to operation 212 and the access system 100 may optionally confirm a grant of access. As shown for example in FIG. 6, the device application 124 may display a user input 602 and/or a user input 604. In some examples, the user input 602 is adapted to generate a message indicating that electronic access of the access device 120 to the controller 102 is granted. In some examples, the user input 604 is adapted to generate a message indicating that electronic access of the access device 120 to the controller 102 is denied. In some examples, the grant of access may be given for a length of time (e.g., the access expires). Similarly, the denial of access may be in place for a length of time before the access device 120 can request access again. In some examples, a grant of access may be substantially permanent such that the access device 120 may access the controller 102 again without operation 212. Similarly, a denial of access may be substantially permanent such that a particular access device 120 is denied access at one or more of the operations of the method 200. In some examples, the access may be based on proximity and once the access device is outside of the geofence or outside of a physical distance threshold, the access may terminate and require a secondary authentication session if the access device wishes to access the controller again.

The access system 100 may log or record interactions between the access device 120, the user device 116 and/or any of the devices controlled by the controller 102. For example, the controller 102 may record access requests, whether successful or not. In some examples, an access device 120 that is denied access by a user 116 may be automatically denied access by the access system 100 when the access device 120 performs future access requests. Additionally or alternately, the access system 100 may record information requested or displayed, and/or settings changed by the access device 120 following a successful access request.

Benefits of the disclosed systems and methods include the ability to easily provide secure access to a controller 102, without cumbersome interactions between a controller 102 owner and a person requesting access to the controller.

Figure 9:
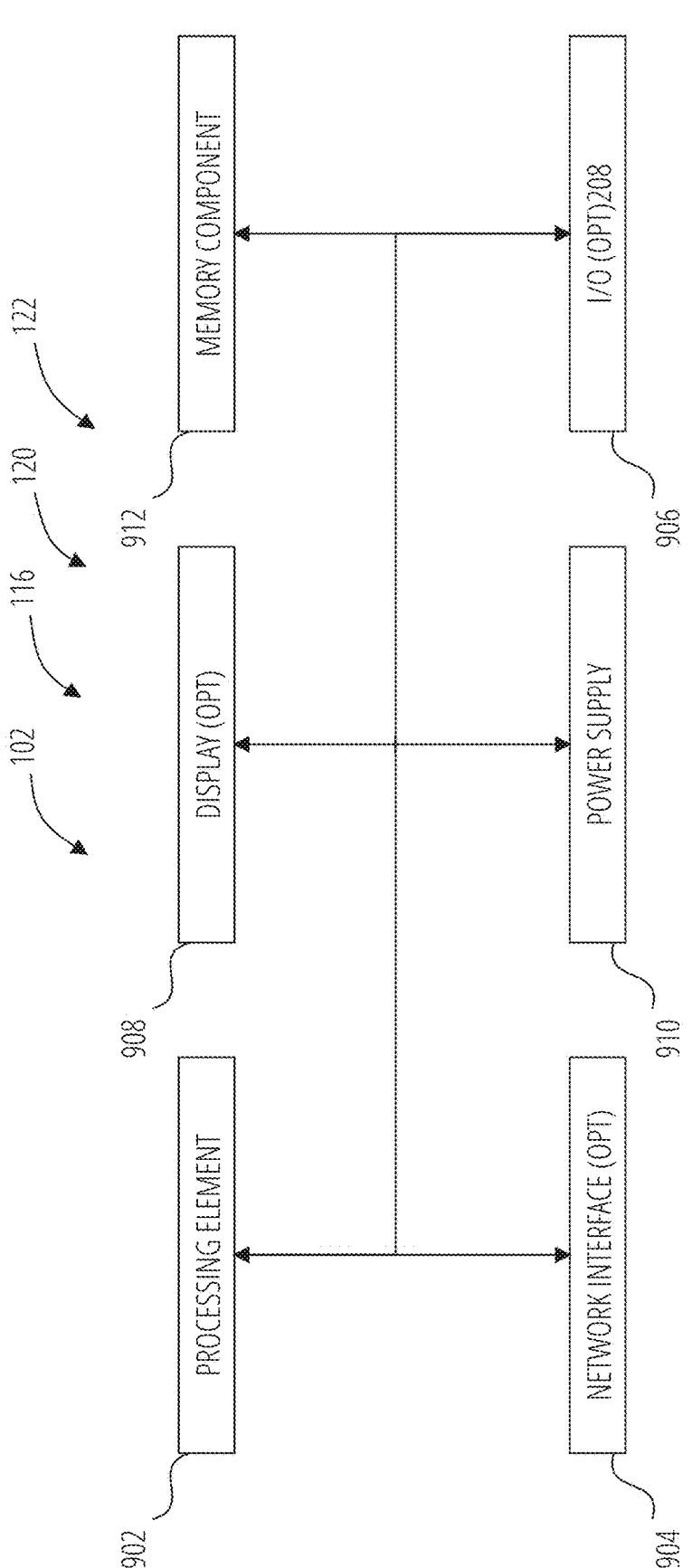
FIG. 9 is a simplified block diagram of the various devices of the system of FIG. 1.

FIG. 9 illustrates a simplified block diagram for the various devices of the access system 100 including the server 122, the user device 116, the access device 120, and/or the controller 102. As shown, the various devices may include one or more processing elements 902, an optional display 908, one or more memory components 912, a network interface 904, optional power supply 910, and an optional input/output I/O interface [706] 906. The various components may be in direct or indirect communication with one another, such as via one or more system buses, contract traces, wiring, or via wireless mechanisms.

The one or more processing elements 902 may be substantially any electronic device capable of processing, receiving, and/or transmitting instructions. For example, the processing elements 902 may be a microprocessor, microcomputer, tensor processing unit, graphics processing unit, or the like. It also should be noted that the processing elements 902 may include one or more processing elements or modules that may or may not be in communication with one another. For example, a first processing element may control a first set of components of the computing device and a second processing element may control a second set of components of the computing device where the first and second processing elements may or may not be in communication with each other. Relatedly, the processing elements may be configured to execute one or more instructions in parallel locally, and/or across the network, such as through cloud computing resources.

The display 908 is optional and provides an input/output mechanism for devices of the access system 100, such as to display visual information (e.g., images, graphical user interfaces, videos, notifications, and the like) to a user 114 and/or access requester 118, and in certain instances may also act to receive user input such as a user input 302, a user input 602, a user input 604 or the like (e.g., via a touch screen or the like). The display may be an LCD screen, plasma screen, LED screen, an organic LED screen, or the like. The type and number of displays may vary with the type of devices (e.g., smartphone versus the server 122 or controller 102).

The memory components 912 store electronic data that may be utilized by the computing devices, such as audio files, video files, document files, geolocation data, authentication data, programming instructions (e.g., for the device application 124 and/or the server application 126), and the like. The memory components 912 may be, for example, non-volatile storage, a magnetic storage medium, optical storage medium, magneto-optical storage medium, read only memory, random access memory, erasable programmable memory, flash memory, or a combination of one or more types of memory components. In many embodiments, the server 122 may have a larger memory capacity than the user device 116, the controller 102, or the access device 120, with the memory components optionally linked via a cloud network 104 or the like.

The network interface 904 receives and transmits data to and from the network 104 to the various devices of the access system 100. The network interface 904 may transmit and send data to the network directly or indirectly. For example, the networking/communication interface may transmit data to and from other computing devices through the network 104. In some embodiments, the network interface 904 may also include various modules, such as an application program interface (API) that interfaces and translates requests across the network 104 to the server 122, the user device 116, the access device 120, and/or the controller 102. The network interface 904 may be any suitable wired or wireless interface or combinations thereof. For example, the network may be an Ethernet network, Wi-Fi, Bluetooth, near field communication, radio frequency identification, Wi-Max, Zigbee network, the internet, microwave link, cellular telephone network, or the like.

The various devices of the system may also include a power supply 910. The power supply 910 provides power to various components of the access device 120, the user device 116, the controller 102, and/or the server 122. The power supply 910 may include one or more rechargeable, disposable, or hardwire sources, e.g., batteries, power cord, AC/DC inverter, DC/DC converter, or the like. Additionally, the power supply 910 may include one or more types of connectors or components that provide different types of power to the user device 116, access device 120, controller 102, and/or server 122. In some embodiments, the power supply 910 may include a connector (such as a universal serial bus) that provides power to the computer or batteries within the computer and also transmits data to and from the device to other devices.

The I/O interface 906 allows the access system 100 devices to receive input from a user 114 and/or access requester 118 and provide output to a user 114 and/or access requester 118. In some devices, for instance the controller 102, the I/O interface 906 may be optional. For example, the I/O interface 906 may include a capacitive touch screen, keyboard, mouse, stylus, or the like. The type of devices that interact via the input/output interface 140 may be varied as desired.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method of providing electronic access to a controller associated with a user, comprising:

receiving, via a processing element, an authorization granting an access device associated with an access requester access to the controller;

receiving, via the processing element, three or more locations relative to the controller selected by a user device associated with a user of the controller;

generating, via the processing element, a virtual boundary relative to the controller based on the three or more locations received from the user device;

determining, via the processing element, a proximity of the access device to the virtual boundary;

determining, via the processing element, that the access device is authorized to access the controller based on the authorization;

automatically providing, via the processing element, based at least in part on the proximity of the access device to the virtual boundary, a grant of access for electronic communications between the controller and the access device;

wherein the controller is a sprinkler controller;

and displaying, on a user interface rendered by the user device associated with the user, a message indicating the grant of access.

2. The method of claim 1, wherein the controller is within an area defined by the virtual boundary and wherein the controller is configured to activate one or more sprinkler valves.

3. The method of claim 1, wherein the proximity of the access device to the virtual boundary is determined based on receipt of a wireless signal from the access device.

4. The method of claim 1, further comprising receiving authentication data related to an access privilege of a user associated with the access device, wherein the authentication data is communicated by the access device to the processor and wherein the processor compares the authentication data against stored information associated with the access requester to verify the authenticity of the authentication data.

5. The method of claim 4, wherein the authentication data comprises a password, a keyword, a passphrase, an employee number, or other identifying information.

6. The method of claim 4, wherein providing the grant of access is based, at least in part, on the authentication data.

7. The method of claim 1, further comprising:

generating a notification based on the grant of access; and receiving from the user device a user input revoking or confirming the grant of access.

8. The method of claim 7, wherein the user input to revoke or confirm the grant of access is generated by the user device responsive to the user device receiving the notification.

9. The method of claim 1, wherein the grant of access includes access to an access level of a plurality of access levels.

10. The method of claim 9, wherein the user interface is based on the access level.

11. The method of claim 1, further comprising modifying a setting of the controller via the user interface.

12. The method of claim 1, wherein the grant of access is for a period of time.

13. The method of claim 12, further comprising automatically revoking the grant of access after the expiration of the period of time.

14. The method of claim 1, further comprising:

displaying, on the user device, a map view associated with the user of the controller, wherein the map view comprises a location of the controller;

receiving, via the processing element, virtual boundary inputs on the user device, wherein the virtual boundary inputs comprise the three or more locations relative to the controller selected by a user device defining the virtual boundary;

generating, via the processing element, an updated map view comprising the location of the controller and a closed virtual boundary defined by the three or more locations relative to the controller selected by a user device;

displaying, on the user device, the updated map view.

15. The method of claim 14, wherein each of three or more locations relative to the controller selected by a user device comprises elevation data, latitude data, and longitude data.

16. A system for providing electronic access to a controller associated with a user, comprising:

a processing element;

a user device associated with the user;

an access device associated with an access requester, wherein the processing element is configured to:

receive an authorization granting an access device associated with an access requester access to the controller;

receive three or more locations relative to the controller selected by a user device associated with a user of the controller;

generating a virtual boundary relative to the controller based on the three or more locations received from the user device;

determine a proximity of the access device to the virtual boundary;

determining that the access device is authorized to access the controller based on the authorization;

automatically provide, based at least in part on the proximity of the access device to the virtual boundary, a grant of access for electronic communications between the controller and the access device;

wherein the controller is a sprinkler controller; and display, on a user interface rendered by the user device, a message indicating the grant of access.

17. The system of claim 16, wherein the controller is within an area defined by the virtual boundary.

18. The system of claim 16, wherein the grant of access is for a period of time and further comprising automatically revoking the grant of access after the expiration of the period of time.

19. The system of claim 16, wherein the processing element is further configured to:

receive authentication data related to an access privilege of a user associated with the access device, wherein the authentication data is communicated by the access device to the processor and wherein the processor compares the authentication data against stored information associated with the access requester to verify the authenticity of the authentication data.

20. The system of claim 16, wherein the processing element is further configured to:

provide the grant of access is based, at least in part, on the authentication data.

* * * * *